US012743798B2

(12) United States Patent
Tervonen et al.

(10) Patent No.: US 12,743,798 B2
(45) Date of Patent: Sep. 22, 2026

(54) IMAGE SAMPLING IN DIFFRACTION GRATING-BASED DISPLAY SYSTEM FOR ALIGNMENT CONTROL

(71) Applicant: Microsoft Technology Licensing, LLC., Redmond, WA (US)

(72) Inventors: Ari Juhani Tervonen, Vantaa (FI); Jani Kari Tapio Tervo, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 1194 days.

(21) Appl. No.: 17/584,969

(22) Filed: Jan. 26, 2022

(65) Prior Publication Data

US 2023/0237678 A1 Jul. 27, 2023

(51) Int. Cl.
*G06T 7/30* (2017.01)
*G02B 27/01* (2006.01)

(52) U.S. Cl.
CPC ............ *G06T 7/30* (2017.01); *G02B 27/0172* (2013.01); *G02B 2027/0125* (2013.01); *G02B 2027/0198* (2013.01)

(58) Field of Classification Search
CPC ..... G06T 7/30; G06T 19/006; G02B 27/0172; G02B 27/017; G02B 2027/0123; G02B 2027/0125; G02B 2027/0178; G02B 2027/0198
See application file for complete search history.

(56) References Cited

U.S. PATENT DOCUMENTS 11,202,043 B1 * 12/2021 Elazhary ............ G02B 27/0176
11,320,571 B2 * 5/2022 Brown ................ G02B 6/0076
(Continued)

FOREIGN PATENT DOCUMENTS

CN 101149564 A * 3/2008
CN 102768471 A * 11/2012
(Continued)

OTHER PUBLICATIONS

CN_119439652_A (English Translation) (Year: 2025).*
(Continued)

*Primary Examiner* — Thomas A Hollweg
*Assistant Examiner* — Mary A El-Shammaa
(74) *Attorney, Agent, or Firm* — Workman Nydegger

(57) ABSTRACT

A display system includes a waveguide plate comprising an in-coupling grating, an expansion grating, and a sampling grating. The display system includes a projection system configured to direct input light toward the in-coupling grating. The in-coupling grating is configured to diffract the input light to propagate within the waveguide plate. The in-coupling grating is configured to (i) cause a display portion of the input light to propagate toward the expansion grating in a manner that avoids diffraction by the expansion grating and (ii) cause a sampling portion of the input light to propagate toward the sampling grating. The expansion grating is configured to (i) diffract the display portion of the input light to cause the display portion of the input light to continue to propagate within the waveguide plate. The sampling grating is configured to diffract the sampling portion of the input light outward from the waveguide plate.

20 Claims, 10 Drawing Sheets

(56) References Cited

U.S. PATENT DOCUMENTS 11,693,248 B1 * 7/2023 Chatterjee ......... G02F 1/136277 349/11
12,085,724 B1 * 9/2024 DeLapp ............. G02B 27/0176
12,092,914 B2 * 9/2024 Waldern ................ B05C 5/0295
12,282,170 B2 * 4/2025 Schowengerdt ..... G02B 6/0016
12,327,554 B1 * 6/2025 Weinberg .............. G06T 19/006
12,335,453 B2 * 6/2025 Yang .................... H04N 13/128
12,455,444 B2 * 10/2025 Pfeiffer .............. G02B 27/0081
2015/0309264 A1 * 10/2015 Abovitz ................... G02B 6/32 385/33
2016/0209657 A1 * 7/2016 Popovich ........... G02B 27/0172
2017/0277259 A1 * 9/2017 Mullins ................ G02B 27/017
2018/0052501 A1 * 2/2018 Jones, Jr. ............. G02B 6/0076
2018/0130227 A1 * 5/2018 Sato ................... G02B 27/0172
2020/0018968 A1 * 1/2020 Edwin .................. G02B 6/0015
2021/0033857 A1 * 2/2021 Waldern ................. G02B 6/005
2021/0185193 A1 * 6/2021 Garofolo .................. G02C 9/00
2021/0199970 A1 * 7/2021 Huang ............... G02B 27/0172
2022/0269075 A1 * 8/2022 Yang .................. G02B 27/0103
2025/0284120 A1 * 9/2025 Sacher ................. G02B 26/103

FOREIGN PATENT DOCUMENTS

CN 106154764 A * 11/2016 ........... G01B 9/0203
CN 108121178 A * 6/2018 ........... G03F 9/7088
CN 119439652 A * 2/2025 ........... G03F 9/7038
EP 3226063 A1 * 10/2017 ......... G02B 27/0172
WO WO-2016046514 A1 * 3/2016 ........... G02B 6/0016
WO WO-2017134412 A1 * 8/2017 ............... A61B 3/10
WO WO-2019068304 A1 * 4/2019 ........... G02B 5/1809
WO WO-2020257469 A1 * 12/2020 ............. G06F 3/017
WO WO-2021262759 A1 * 12/2021 ......... G02B 27/0172

OTHER PUBLICATIONS

CN_101149564_A (English translation) (Year: 2008).*
CN_102768471_A (English translation) (Year: 2012).*
CN_106154764_A (English translation) (Year: 2016).*
CN_108121178_A (English translation) (Year: 2018).*
"International Search Report and Written Opinion issued in PCT Application No. PCT/US22/048324", Mailed Date: Feb. 1, 24, 2023, 10 Pages.
First Examination Report Received for Indian Application No. 202417052873, mailed on May 20, 2026, 7 pages.

* cited by examiner

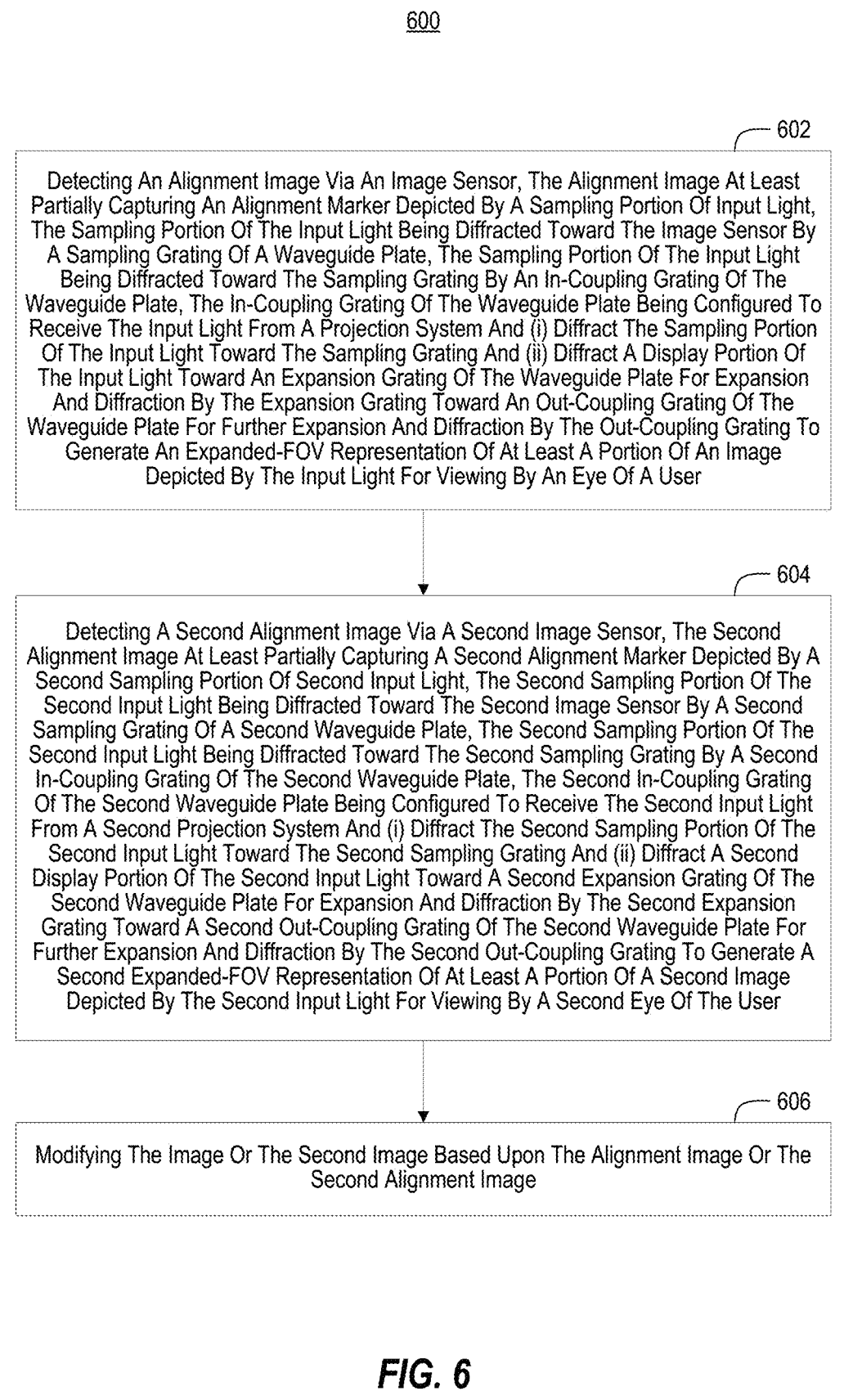

600

602

Detecting An Alignment Image Via An Image Sensor, The Alignment Image At Least Partially Capturing An Alignment Marker Depicted By A Sampling Portion Of Input Light, The Sampling Portion Of The Input Light Being Diffracted Toward The Image Sensor By A Sampling Grating Of A Waveguide Plate, The Sampling Portion Of The Input Light Being Diffracted Toward The Sampling Grating By An In-Coupling Grating Of The Waveguide Plate, The In-Coupling Grating Of The Waveguide Plate Being Configured To Receive The Input Light From A Projection System And (i) Diffract The Sampling Portion Of The Input Light Toward The Sampling Grating And (ii) Diffract A Display Portion Of The Input Light Toward An Expansion Grating Of The Waveguide Plate For Expansion And Diffraction By The Expansion Grating Toward An Out-Coupling Grating Of The Waveguide Plate For Further Expansion And Diffraction By The Out-Coupling Grating To Generate An Expanded-FOV Representation Of At Least A Portion Of An Image Depicted By The Input Light For Viewing By An Eye Of A User

604

Detecting A Second Alignment Image Via A Second Image Sensor, The Second Alignment Image At Least Partially Capturing A Second Alignment Marker Depicted By A Second Sampling Portion Of Second Input Light, The Second Sampling Portion Of The Second Input Light Being Diffracted Toward The Second Image Sensor By A Second Sampling Grating Of A Second Waveguide Plate, The Second Sampling Portion Of The Second Input Light Being Diffracted Toward The Second Sampling Grating By A Second In-Coupling Grating Of The Second Waveguide Plate, The Second In-Coupling Grating Of The Second Waveguide Plate Being Configured To Receive The Second Input Light From A Second Projection System And (i) Diffract The Second Sampling Portion Of The Second Input Light Toward The Second Sampling Grating And (ii) Diffract A Second Display Portion Of The Second Input Light Toward A Second Expansion Grating Of The Second Waveguide Plate For Expansion And Diffraction By The Second Expansion Grating Toward A Second Out-Coupling Grating Of The Second Waveguide Plate For Further Expansion And Diffraction By The Second Out-Coupling Grating To Generate A Second Expanded-FOV Representation Of At Least A Portion Of A Second Image Depicted By The Second Input Light For Viewing By A Second Eye Of The User

606

Modifying The Image Or The Second Image Based Upon The Alignment Image Or The Second Alignment Image

*FIG. 6*

IMAGE SAMPLING IN DIFFRACTION GRATING-BASED DISPLAY SYSTEM FOR ALIGNMENT CONTROL

BACKGROUND

Mixed-reality (MR) systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved, in VR systems, through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

AR systems typically include transparent display elements through which light for forming images is projected for viewing by an end user. For example, a display element may comprise a set of transparent plates (e.g., glass, plastic, or other transparent plates) and a light projection system (e.g., including one or more light sources and one or more microelectromechanical system mirrors) that projects light toward the set of glass plates. The set of glass plates may receive and expand the input light in multiple dimensions to provide a field of view (FOV) through which an image may be viewed by a user.

Many AR systems include separate display elements for displaying images to separate eyes of the user. To create a realistic immersive experience, the image output displayed by the separate display elements should be synchronized and spatially aligned. However, many factors may give rise to inconsistencies between the image output displayed by separate display elements within the same AR system (e.g., manufacturing variances, temperature differences, mechanical changes over time due to vibration/shock, etc.).

Facilitating alignment between separate display elements of AR systems is associated with many challenges. There is an ongoing need and desire for improvements to systems and methods for facilitating image alignment of separate display elements.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems, methods, and devices for image sampling in diffraction grating display systems for facilitating alignment control. Although at least some examples provided herein focus on surface relief grating (SRG) displays, one will appreciate, in view of the present disclosure, that other types of gratings may be utilized, such as holographic gratings, photonic crystals, Bragg polarization gratings, volume gratings, and/or others.

Some disclosed display systems include a waveguide plate comprising opposing parallel surfaces, an in-coupling grating, an expansion grating, and a sampling grating. The display system further includes a projection system configured to direct input light toward the in-coupling grating. The in-coupling grating is configured to diffract the input light to cause total internal reflection of the input light within the waveguide plate via the opposing parallel surfaces of the waveguide plate. The in-coupling grating is configured to (i) cause a display portion of the input light to propagate within the waveguide plate toward the expansion grating and (ii) cause a sampling portion of the input light to propagate within the waveguide plate toward the sampling grating. The expansion grating is configured to (i) diffract the display portion of the input light in a manner that expands a field-of-view (FOV) of the display portion of the input light in at least a first dimension and (ii) cause the display portion of the input light to continue to propagate within the waveguide plate. The sampling grating is configured to diffract the sampling portion of the input light outward from the waveguide plate.

Some disclosed display systems include a waveguide stack including a plurality of waveguide plates. Each waveguide plate may include respective opposing parallel surfaces, a respective in-coupling grating, a respective expansion grating, and a respective out-coupling grating. The display system further includes a projection system configured to direct input light toward each of the respective in-coupling gratings of the waveguide stack. For each waveguide plate, the respective in-coupling grating is configured to cause at least a portion of the input light to propagate within the waveguide plate toward the respective expansion grating, and the respective expansion grating is configured to diffract at least the portion of the input light toward the respective out-coupling grating to generate an expanded-FOV representation of an image for viewing by an eye of a user. At least one waveguide plate of the plurality of waveguide plates further comprises a sampling grating. For the at least one waveguide plate, the respective in-coupling grating is configured to cause a sampling portion of the input light to propagate within the at least one waveguide plate toward the sampling grating, and the sampling grating is configured to diffract the sampling portion of the input light outward from the waveguide plate.

At least some disclosed methods include detecting an alignment image via an image sensor, the alignment image at least partially capturing an alignment marker depicted by a sampling portion of input light, the sampling portion of the input light being diffracted toward the image sensor by a sampling grating of a waveguide plate, the sampling portion of the input light being diffracted toward the sampling grating by an in-coupling grating of the waveguide plate, the in-coupling grating of the waveguide plate being configured to receive the input light from a projection system and (i) diffract the sampling portion of the input light toward the sampling grating and (ii) diffract a display portion of the input light toward an expansion grating of the waveguide plate for expansion and diffraction by the expansion grating toward an out-coupling grating of the waveguide plate for further expansion and diffraction by the out-coupling grating to generate an expanded-FOV representation of at least a portion of an image depicted by the input light for viewing by an eye of a user. The method further includes detecting a second alignment image via a second image sensor, the second alignment image at least partially capturing a second alignment marker depicted by a second sampling portion of second input light, the second sampling portion of the second input light being diffracted toward the second image sensor by a second sampling grating of a second waveguide plate, the second sampling portion of the second input light being diffracted toward the second sampling grating by a second in-coupling grating of the second waveguide plate, the second in-coupling grating of the second waveguide plate being configured to receive the second input light from a second projection system and (i) diffract the second sampling portion of the second input light toward the second sampling grating and (ii) diffract a second display portion of the second input light toward a second expansion grating of the second waveguide plate for expansion and diffraction by the second expansion grating toward a second out-coupling grating of the second waveguide plate for further expansion and diffraction by the second out-coupling grating to generate a second expanded-FOV representation of at least a portion of a second image depicted by the second input light for viewing by a second eye of the user. The method further includes modifying the image or the second image based upon the alignment image or the second alignment image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 6 illustrates an example flow diagram depicting acts associated with facilitating alignment control of image output.

DETAILED DESCRIPTION

Figure 1:
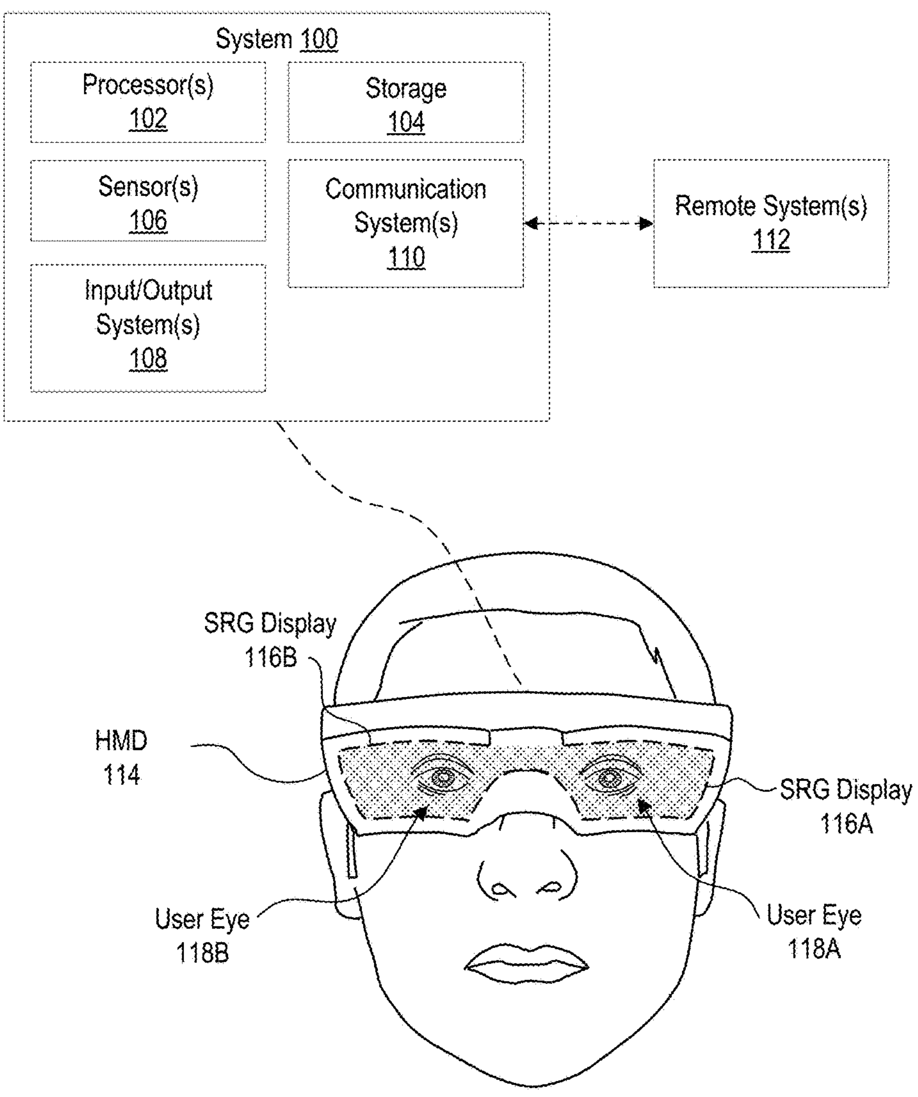
FIG. 1 illustrates example components of an example system that may include or be used to implement one or more disclosed embodiments.

Disclosed embodiments are generally directed to systems, methods, and devices for image sampling in surface relief grating (SRG) display systems for facilitating alignment control. Although the present disclosure focuses, in at least some respects, on SRG display systems and/or augmented reality (AR) systems, one will appreciate, in view of the present disclosure, that the principles disclosed herein are not limited to such implementations and may be applied to other fields of endeavor (e.g., other types of gratings and/or display devices).

Examples of Technical Benefits, Improvements, and Practical Applications

Those skilled in the art will recognize, in view of the present disclosure, that at least some of the disclosed embodiments may be implemented to address various shortcomings associated with facilitating alignment control of different SRG display systems. The following section outlines some example improvements and/or practical applications provided by the disclosed embodiments. It will be appreciated, however, that the following are examples only and that the embodiments described herein are in no way limited to the example improvements discussed herein.

A display system, in accordance with the present disclosure, may implement one or more waveguide plates that include at least an in-coupling grating, an expansion grating, and a sampling grating. The in-coupling grating may be configured to diffract a display portion of input light toward the expansion grating (for further diffraction toward an out-coupling grating) and to diffract a sampling portion of the input light toward the sampling grating. The sampling grating may out-couple the sampling portion of the input light toward an image sensor, which may capture a test image.

The input light may depict a representation of an input image. The display portion of the input light may depict portions of the input image intended for viewing by an eye user. The display portion of the light diffracted by the expansion grating may propagate toward an out-coupling grating for further diffraction toward the eye of the user. Propagation of the display portion of the input light through the waveguide plate (e.g., being diffracted by the in-coupling grating, the expansion grating, and the out-coupling grating) may expand the display portion of the input light to cause propagate thereof with multiple replicas, thereby allowing the display portion of the input image to be viewable through a larger area of the out-coupling grating.

The input image may comprise an alignment marker (e.g., crosshairs arranged on a small part of the input image, such as an edge thereof), which may be depicted by the sampling portion of the input light. The sampling grating may be arranged to receive this sampling portion of the input light after it is diffracted by the in-coupling grating, whereas, as noted above, the expansion grating may be arranged to receive the display portion of the input light after it is diffracted by the in-coupling grating. In contrast with the display portion of the input light, the sampling portion of the input light may avoid diffraction by the expansion grating (e.g., even where the in-coupling grating has a uniform grating period and grating orientation).

By separating the sampling portion of the input light from the display portion of the input light, the test image may capture the alignment marker and may be used to facilitate alignment between the image displayed via the waveguide plate and a complementary image displayed by another waveguide plate (e.g., a separate waveguide plate arranged to display image content to a separate eye of a user, thereby enabling or improving binocular viewing of image content).

Because the sampling portion of the input light avoids diffraction by the expansion grating, a test image captured in accordance with the present disclosure may comprise an improved image signal (e.g., in contrast with an approach that includes arranging the sampling grating to receive the remainder of the display portion of the input light after diffraction by the expansion grating).

Having just described some of the various high-level features and benefits of the disclosed embodiments, attention will now be directed to FIGS. 1 through 6. These Figures illustrate various conceptual representations, architectures, methods, and supporting illustrations related to the disclosed embodiments.

Example Systems and Techniques for Facilitating Alignment Control of Image Output Attention is now directed to FIG. 1, which illustrates an example system 100 that may include or be used to implement one or more disclosed embodiments. FIG. 1 depicts the system 100 as a head-mounted display 114 (HMD 114) configured for placement over a head of a user to display virtual content for viewing by the user's eyes 118A and 118B. Such an HMD 114 may comprise an augmented reality (AR) system, a virtual reality (VR) system, and/or any other type of HMD. Although the present disclosure focuses, in at least some respects, on a system 100 implemented as an HMD 114, it should be noted that the techniques described herein may be implemented using other types of systems/devices, without limitation.

FIG. 1 illustrates various example components of the system 100. For example, FIG. 1 illustrates an implementation in which the system includes processor(s) 102, storage 104, sensor(s) 106, I/O system(s) 108, and communication system(s) 110. Although FIG. 1 illustrates a system 100 as including particular components, one will appreciate, in view of the present disclosure, that a system 100 may comprise any number of additional or alternative components.

The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 110 or otherwise), or some combination thereof. Additional details related to processors (e.g., processor(s) 102) and computer storage media (e.g., storage 104) will be provided hereinafter.

As will be described in more detail, the processor(s) 102 may be configured to execute instructions stored within storage 104 to perform certain actions. In some instances, the actions may rely at least in part on communication system(s) 110 for receiving data from remote system(s) 112, which may include, for example, separate systems or computing devices, sensors, and/or others. The communications system(s) 110 may comprise any combination of software or hardware components that are operable to facilitate communication between on-system components/devices and/or with off-system components/devices. For example, the communications system(s) 110 may comprise ports, buses, or other physical connection apparatuses for communicating with other devices/components. Additionally, or alternatively, the communications system(s) 110 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 106. Sensor(s) 106 may comprise any device for capturing or measuring data representative of perceivable phenomenon. By way of non-limiting example, the sensor(s) 106 may comprise one or more image sensors, microphones, thermometers, barometers, magnetometers, accelerometers, gyroscopes, and/or others.

Furthermore, FIG. 1 illustrates that a system 100 may comprise or be in communication with I/O system(s) 108. I/O system(s) 108 may include any type of input or output device such as, by way of non-limiting example, a touch screen, a mouse, a keyboard, a controller, and/or others, without limitation. For example, the I/O system(s) 108 may include a display system that may comprise any number of display panels, optics, laser scanning display assemblies, and/or other components.

For instance, the I/O system(s) 108 of the system 100 (e.g., implemented as an HMD 114) may comprise surface relief grating (SRG) displays 116A and 116B configured for displaying image for viewing by eyes of a user (e.g., user eyes 118A and 118B, respectively). The SRG displays 116A and 116B may each comprise one or more glass plates that include diffractive optical elements (DOES) disposed thereon. Although the present example (and other portions of the present disclosure) may specifically recite surface relief gratings, other types of gratings are within the scope of the present disclosure.

The SRG displays 116A and 116B may be configured to receive light from projection systems (e.g., microelectromechanical projectors), where the light depicts an image for viewing by the eyes 118A and 118B of the user. The SRG displays 116A and 116B may expand a field of view (FOV) to allow the user's eyes 118A and 118B to view the image content through large portions of the SRG displays 116A and 116B.

As noted above, the SRG displays 116A and 116B may each comprise one or more respective glass plates for facilitating their image displaying functions. FIGS. 2A-3B depict example components of such glass plates. One will appreciate, in view of the present disclosure, that the particular shapes/forms/configurations of the components of FIGS. 2A-3B are provided by way of conceptual example only and are not intended to limit the scope of the present disclosure.

Figure 2A:
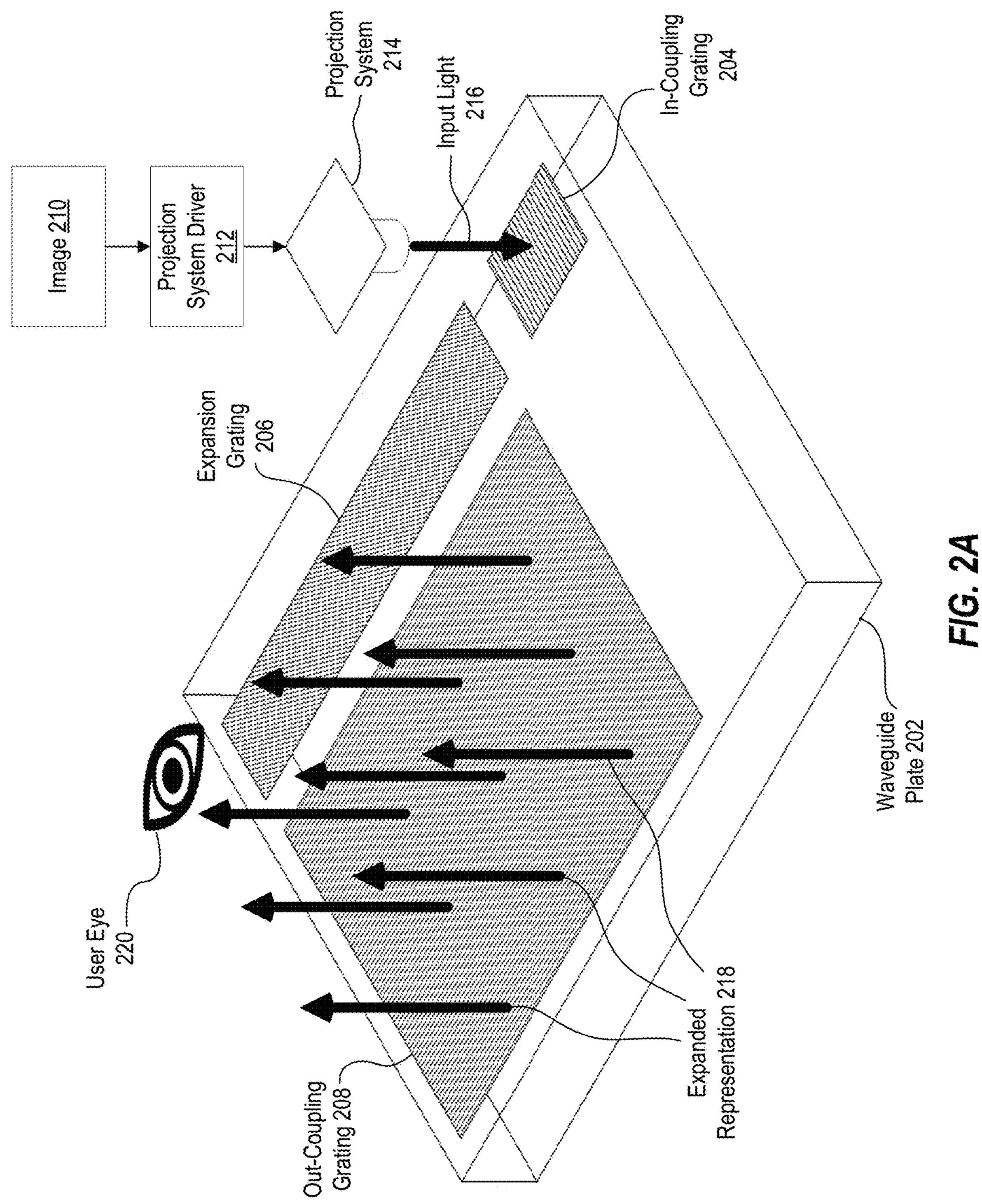
FIGS. 2A through 2D illustrate various views of a schematic representation of example components of a waveguide plate.

FIG. 2A depicts a waveguide plate 202, which may form at least a part of an SRG display (e.g., SRG displays 116A, 116B). FIG. 2A shows that a waveguide plate 202 may comprise various gratings, such as an in-coupling grating 204, an expansion grating 206, and an out-coupling grating 208. The in-coupling grating 204 may be configured to receive input light 216 and diffract the input light 216 for propagation within the waveguide plate 202. The input light 216 may be generated by a projection system 214 (e.g., a microelectromechanical projector and/or laser and mirror system; a microdisplay panel (reflective or transmissive) illuminated by a laser, LED, or other light source with optics for panel illumination and for projection of the panel image, etc.) driven by a projection system driver 212. The projection system driver 212 may drive the projection system 214 in accordance with image input (e.g., image 210 of FIG. 2A) to cause the input light 216 generated by the projection system 214 to depict or represent the image 210.

After diffraction by the in-coupling grating 204, the input light 216 is further diffracted by the expansion grating 206 and the out-coupling grating 208. The out-coupling grating 208 may diffract an expanded representation 218 of at least a portion of the image 210 outward from the waveguide plate 202 for viewing by an eye of a user 220. Diffraction of the input light 216 through the various gratings of the waveguide plate 202 causes replica expansion of the input light 216 which may cause the image pixels forming the image 210 to be visible through multiple locations on the out-coupling grating 208 (e.g., with the image appearing to be at an infinite distance and observable across a range of different eye positions).

Figure 2B:
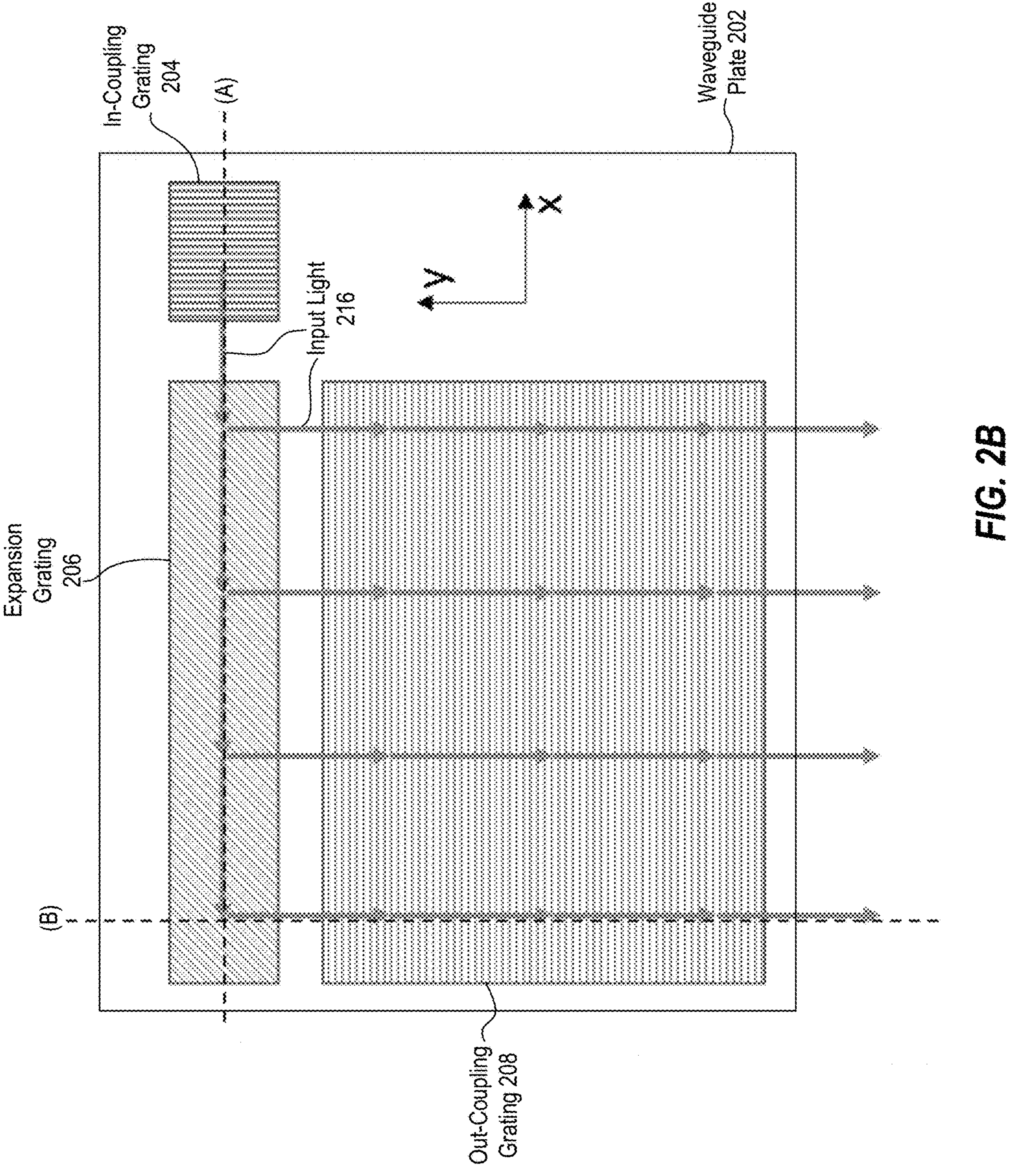
Figure 2C:
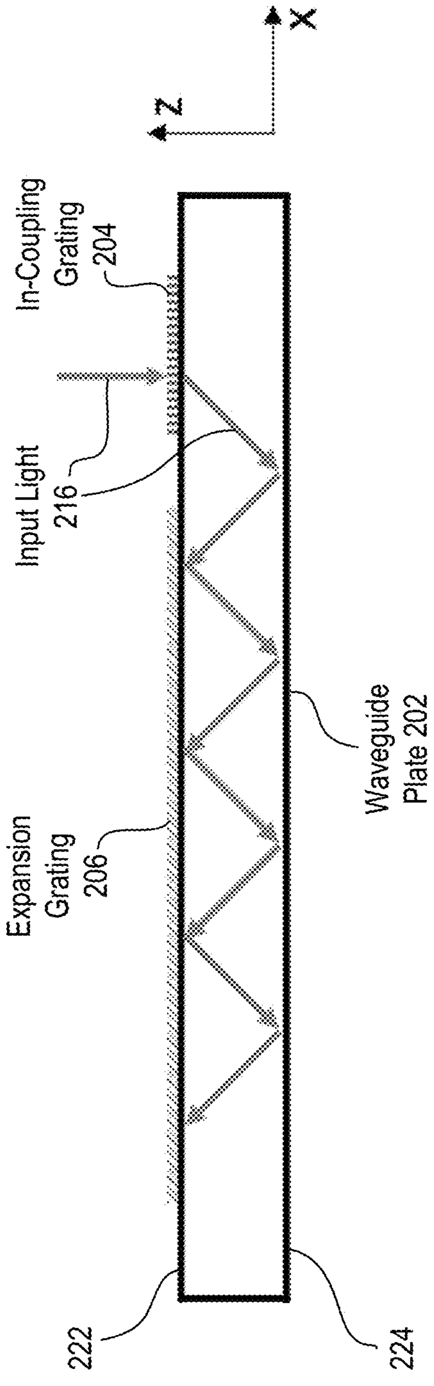
Figure 2D:
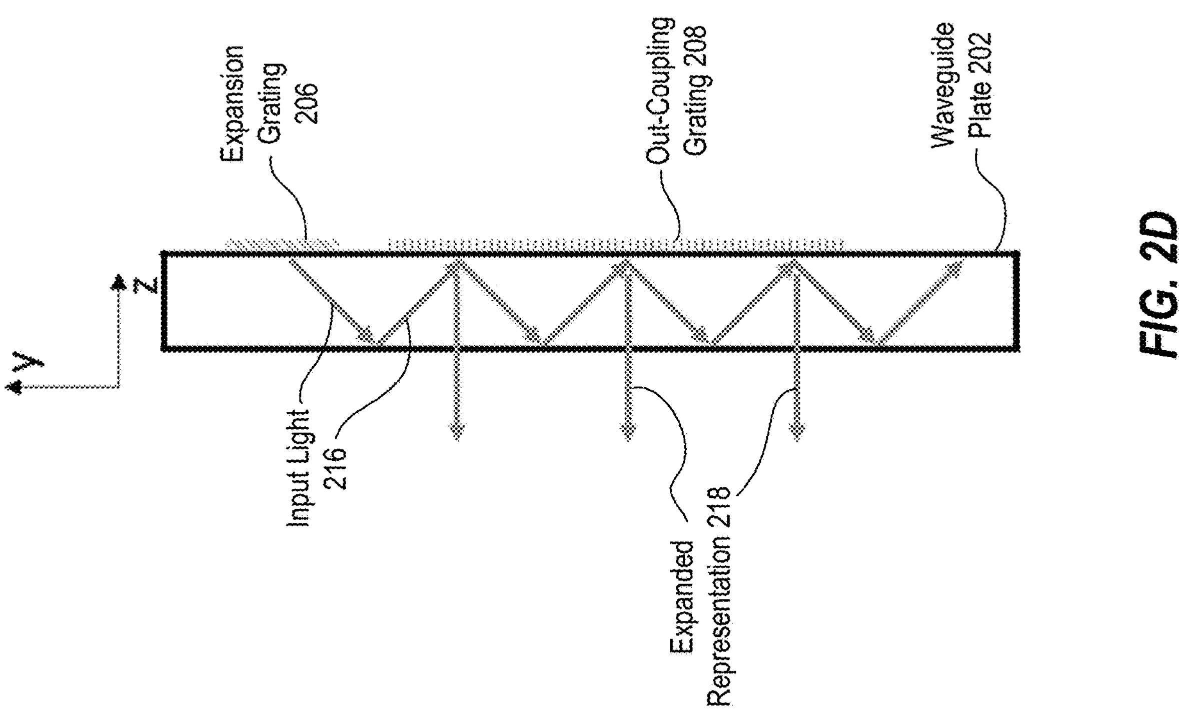

FIGS. 2B, 2C, and 2D provide additional insight into propagation of the input light 216 through the waveguide plate 202. For instance, FIG. 2B shows a top view of the waveguide plate 202, FIG. 2C shows a front sectional view of the waveguide plate 202 (sectioned along dashed line (A) shown in FIG. 2B), and FIG. 2D shows a side sectional view of the waveguide plate 202 (sectioned along dashed line (B) shown in FIG. 2B). Relevant x, y, and z-axes are illustrated in FIGS. 2B through 2D for clarity.

FIG. 2B shows the input light 216 diffracted from the in-coupling grating 204 toward the expansion grating 206 of the waveguide plate 202. FIG. 2C furthermore shows that the in-coupling grating 204 diffracts the input light 216 in a manner that causes total internal reflection of the input light 216 within the waveguide plate 202 (e.g., between opposing parallel surfaces 222 and 224 of the waveguide plate 202). The input light 216 propagates to various portions of the expansion grating 206. The expansion grating 206 thus allows the input light 216 to expand in one direction/dimension (e.g., along the length of the expansion grating 206).

As shown in FIG. 2D, the expansion grating 206 diffracts the input light 216 in a manner that causes the input light 216 to continue to propagate within the waveguide plate 202 (e.g., via total internal reflection) toward various portions of the out-coupling grating 208, allowing the input light to further expand in another direction/dimension (e.g., along the length of the out-coupling grating 208). In this regard, the out-coupling grating 208 may also facilitate expansion of the input light 216 within the waveguide plate 202.

The out-coupling grating 208 is configured to diffract the input light 216 outward from the waveguide plate 202, shown in FIG. 2D by the expanded representation 218 diffracting outward from the waveguide plate 202. As noted above, the expanded representation 218 may be viewed by an eye of a user from various viewing angles.

While FIGS. 2A through 2D illustrate propagation of a single beam of input light through the waveguide plate 202 (e.g., forming a pixel of an image), multiple beams of input light may propagate through the waveguide plate 202 (e.g., being projected toward the in-coupling grating 404 with different incident angles) to form a representation of an image (e.g., to form multiple pixels of an input image, such as image 210 of FIG. 2A).

Furthermore, in some instances, multiple waveguide plates are utilized to form a representation of an input image. For example, FIGS. 3A and 3B illustrate various views of a waveguide stack 300 that includes a plurality of waveguide plates 302A, 302B, and 302C usable to expand a projection of input light 310 representing an image for viewing by a user.

Figure 3A:
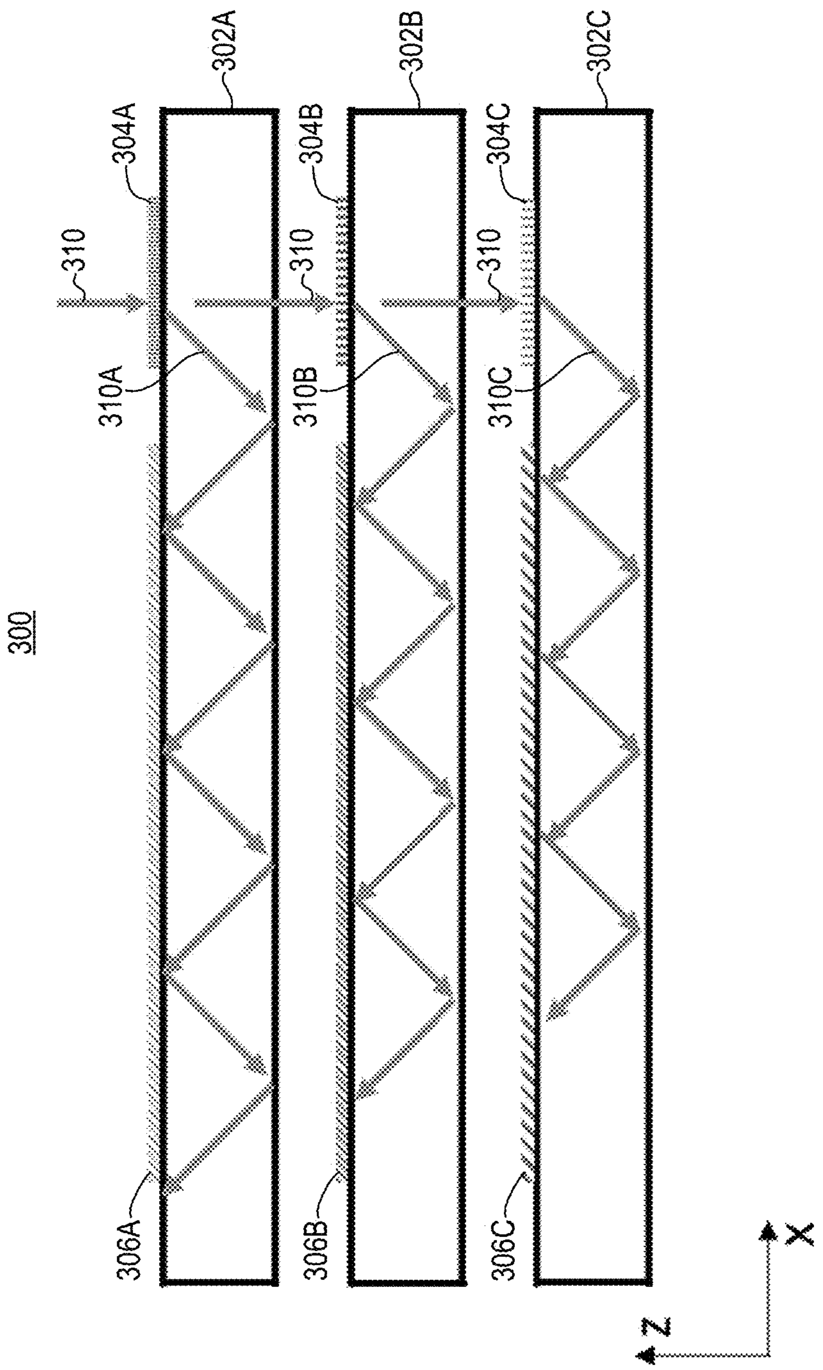
FIGS. 3A and 3B illustrate various views of a schematic representation of example components of a waveguide stack.
Figure 3B:
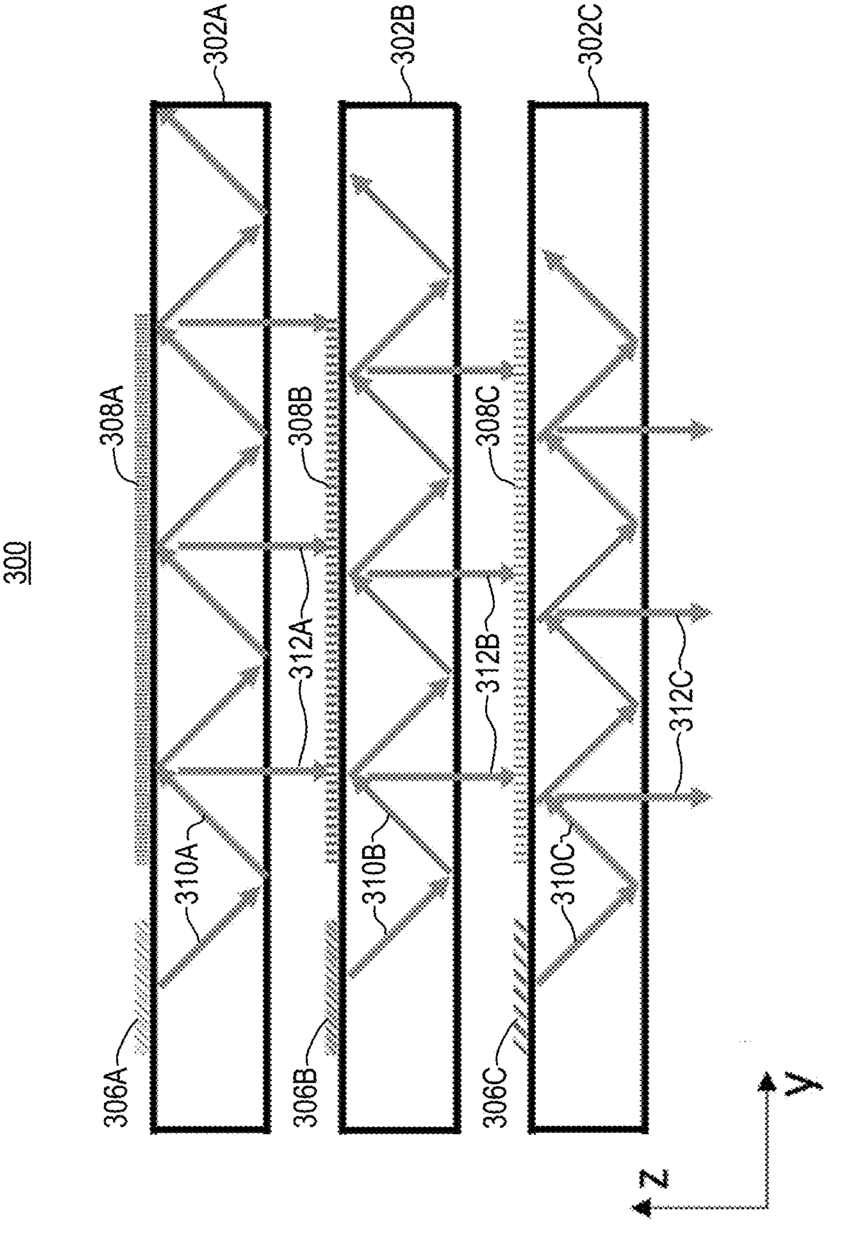

As shown in FIGS. 3A and 3B, each of the waveguide plates 302A, 302B, and 302C includes a respective in-coupling grating 304A, 304B, and 304C, a respective expansion grating 306A, 306B, and 306B, and a respective out-coupling grating 308A, 308B, and 308C. As shown in FIG. 3A, different portions of the input light 310 are in-coupled by the different in-coupling gratings 304A, 304B, and 304C. For instance, portion 310A of the input light 310 is in-coupled by in-coupling grating 304A for propagation through waveguide plate 302A toward expansion grating 306A. Similarly, portion 310B of the input light 310 is in-coupled by in-coupling grating 304B for propagation through waveguide plate 302B toward expansion grating 306B. Furthermore, portion 310C of the input light 310 is in-coupled by in-coupling grating 304C for propagation through waveguide plate 302C toward expansion grating 306C. The different portions 310A, 310B, and 310C of the input light may correspond to different color channels (e.g., red, green, blue) and/or different image regions.

As shown in FIG. 3B, expansion grating 306A diffracts portion 310A of the input light 310 toward out-coupling grating 308A to cause out-coupling of expanded representation 312A. Similarly, expansion grating 306B diffracts portion 310B of the input light 310 toward out-coupling grating 308B to cause out-coupling of expanded representation 312B. Furthermore, expansion grating 306C diffracts portion 310C of the input light 310 toward out-coupling grating 308C to cause out-coupling of expanded representation 312C. The different expanded portions 312A, 312B, and 312C may be viewed simultaneously by a user and perceived as a depiction of an input image.

As noted above, in some instances, a waveguide plate (or waveguide stack) may be utilized in combination with another waveguide plate (or waveguide stack) to provide users with binocular representations of input imagery (e.g., see HMD 114 of FIG. 1, with different SRG displays 116A and 116B for presentation to different user eyes 118A and 118B). In accordance with the present disclosure, alignment components may be implemented to ensure that the imagery shown via the different waveguide plates (or different waveguide stacks) are aligned to provide a realistic representation of the input imagery.

Figure 4:
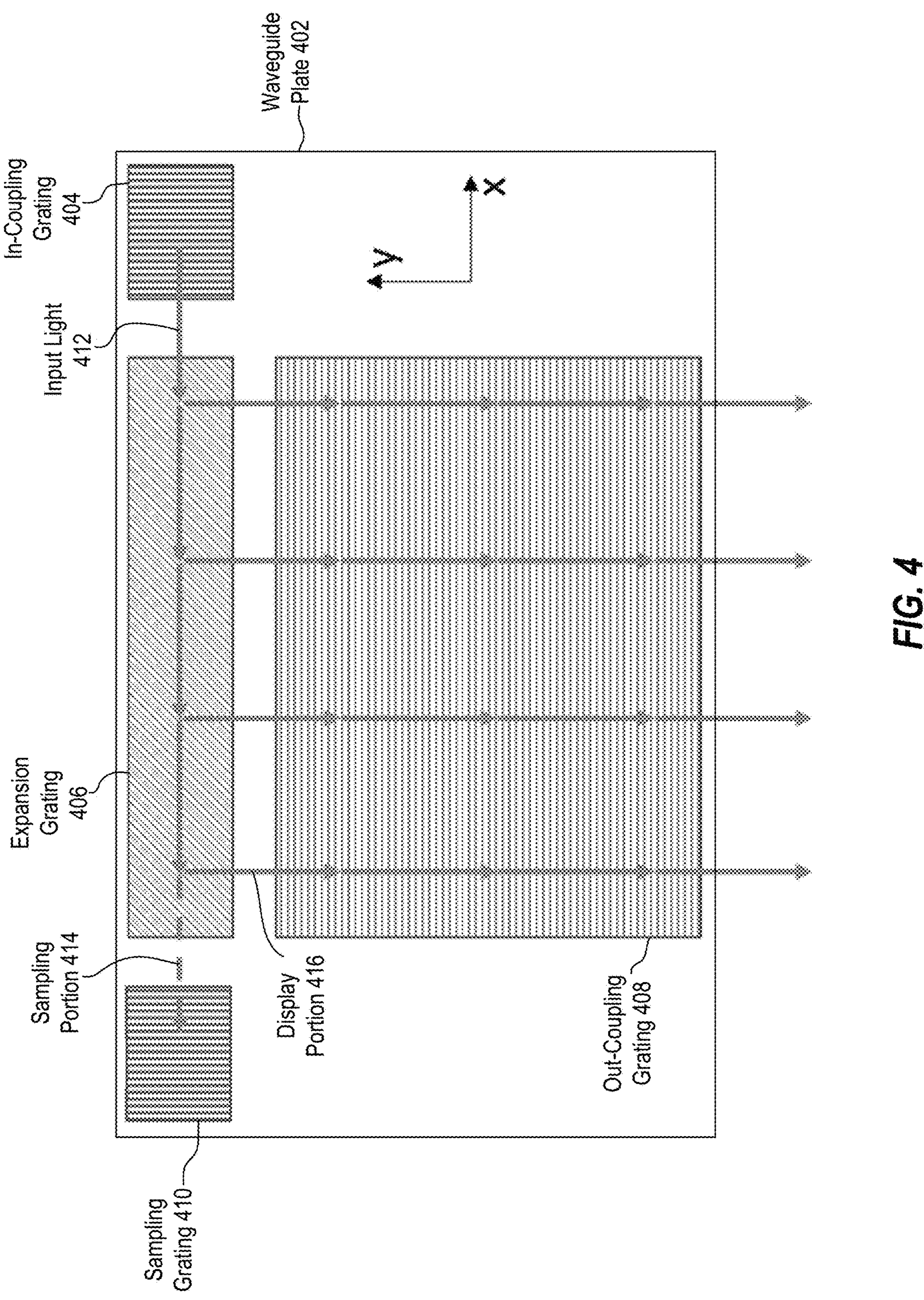
FIG. 4 illustrates a schematic representation of an example waveguide plate that includes a sampling grating, in accordance with implementations of the present disclosure.

FIG. 4 illustrates a schematic representation of an example waveguide plate 402 that includes a sampling grating 410 in addition to an in-coupling grating 404, an expansion grating 406, and an out-coupling grating 408. The in-coupling grating 404, the expansion grating 406, and the out-coupling grating 408 correspond generally to commonly named gratings described hereinabove.

In some instances, the sampling grating 410 is disposed on the same side of the waveguide plate 402 as the in-coupling grating 404, the expansion grating 406, and/or the out-coupling grating. In some instances, the sampling grating 410 has the same grating period and/or grating orientation as the in-coupling grating 404. As will be described in more detail hereinbelow, the sampling grating 410 diffracts light outward from the waveguide plate 402. However, the sampling grating 410 is distinct from the out-coupling grating 408 and may have a different grating period and/or grating orientation than the out-coupling grating 408.

As shown in the example depicted in FIG. 4, the in-coupling grating 404 is configured to in-couple input light 412 to the waveguide plate 402 for propagation therethrough. In the example of FIG. 4, the input light 412 comprises a display portion 416 and a sampling portion. The in-coupling grating 404 causes the display portion 416 of the input light to propagate within the waveguide plate 402 toward the expansion grating 406 for diffraction by the expansion grating 406 toward the out-coupling grating 408. The in-coupling grating 404 causes the sampling portion 414 to propagate within the waveguide plate 402 in a manner that avoids diffraction by the expansion grating 406, allowing the sampling portion 414 to reach the sampling grating 410 without being diminished in intensity by the expansion grating 406. For example, the expansion grating 406 and the sampling grating 410 may be positioned on the waveguide plate 402 to receive different portions of the input light 412 diffracted by the in-coupling grating 404 (e.g., even where the in-coupling grating 404 comprises a single grating where the region of the in-coupling grating 404 that diffracts the display portion 416 of the input light 412 toward the expansion grating 406 has the same grating period and grating orientation as the region of the in-coupling grating 404 that diffracts the sampling portion 414 of the input light 412 toward the sampling grating 410).

As indicated above, the sampling grating 410 diffracts the sampling portion 414 of the input light 412 outward from the waveguide plate 402, such as toward an image sensor (e.g., of sensors 106 of a system 100 or HMD 114) to facilitate detection of an alignment image by the image sensor. As also indicated above, the sampling portion 414 of the input light may depict a portion of an input image (e.g., image 210) that includes an alignment marker (e.g., crosshairs or other symbols, icons, features, etc.). The alignment image may be analyzed to detect distortion and/or undesired transformation of the alignment marker, and compensatory transformations/modifications may be applied to subsequent imagery to correct for the detected image distortions.

In some instances, such alignment functionality may be advantageous when a waveguide plate 402 configured to display imagery to one user eye operates in conjunction with another waveguide plate configured to display corresponding imagery to another user eye (e.g., to provide binocular views of input imagery). For instance, the SRG displays 116A and 116B of the HMD 114 of FIG. 1 may each include respective sets of components shown in FIG. 4. Each may receive input light from a projector system and in-couple the light via an in-coupling grating. For each SRG display 116A and 116B, the in-coupling grating may diffract a sampling portion of the input light toward a sampling grating for out-coupling toward an image sensor. The image sensors may capture the sampling portion (which may depict an alignment marker), and transformations/modifications may be applied to subsequent imagery to provide spatially accurate and/or undistorted views of input imagery (e.g., binocular imagery).

Figure 5:
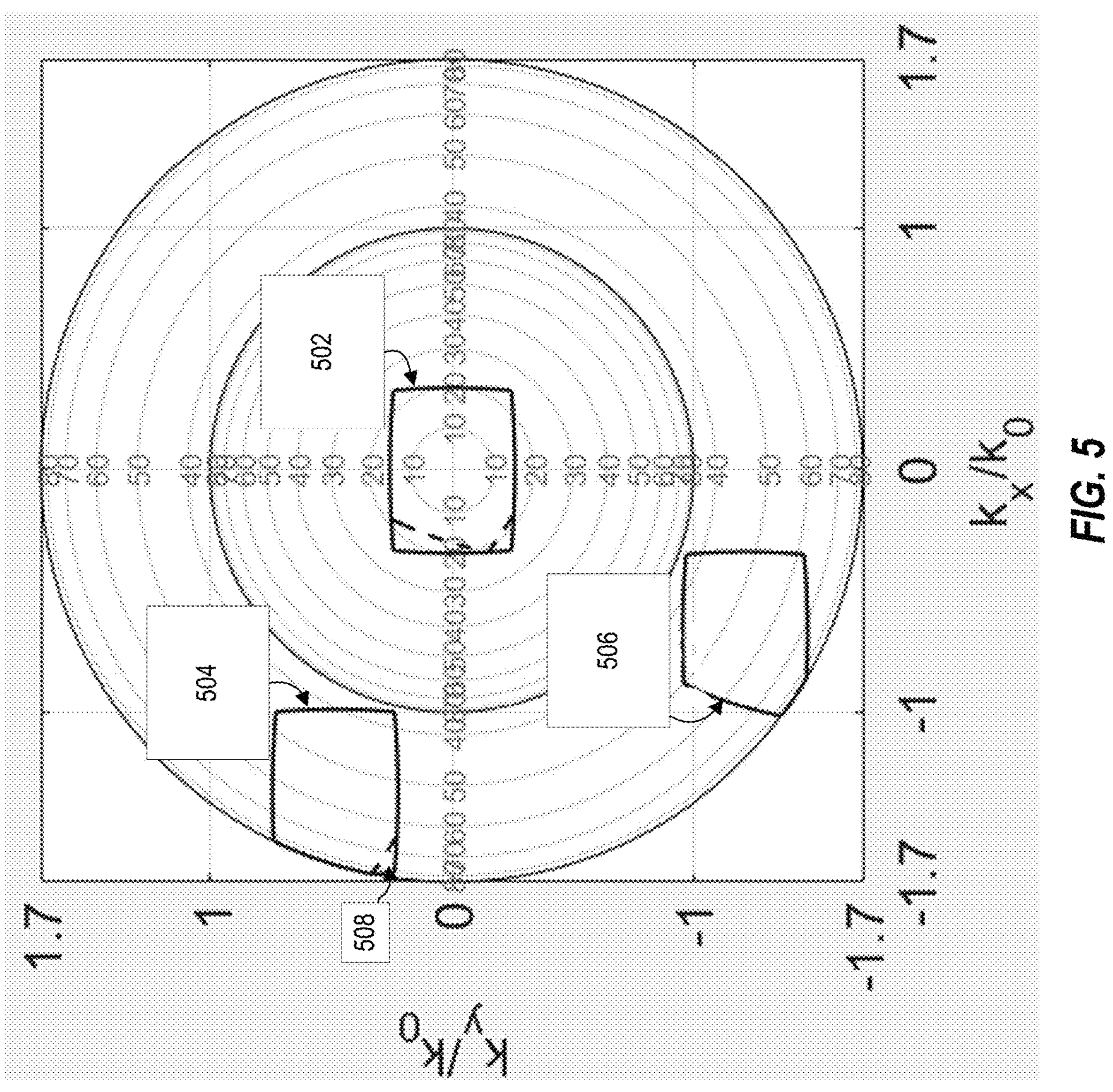
FIG. 5 illustrates an example k-vector diagram of light propagation through a waveguide plate, in accordance with implementations of the present disclosure.

FIG. 5 illustrates an example k-vector diagram of light propagation through a waveguide plate that includes an in-coupling grating, expansion grating, out-coupling grating, and sampling grating, in accordance with the present disclosure. The coordinate system of the k-vector representation of FIG. 5 is selected to have plate surfaces in x-y-plane and z axis normal to the plate surfaces. Each point in diagram corresponds to a projection of vector $$\frac{k}{k_0}$$

in the x-y-plane, $$\left(\frac{k_x}{k_0}\right)i+\left(\frac{k_y}{k_0}\right)j.$$

Here, k represents the wave vector of light, $$k_0=\frac{2\pi}{\lambda_0},$$

where $\lambda_0$ represents vacuum wavelength. The direction of the vector $$\frac{k}{k_0}$$

is the direction or light propagation, and the magnitude of the vector $$\frac{k}{k_0}$$

is the retractive index n of the material in which the light is propagating. The inner circle in the diagram of FIG. 5 has a radius of 1 and corresponds to light rays that can propagate in air and can be transmitted through surfaces of waveguide plates as discussed herein. The external boundary of the diagram of FIG. 5 has a radius corresponding to the refractive index of the plate material (typically glass, with a refractive index of 1.7 in the example shown in FIG. 5). Light located in the (donut-shaped) zone of the diagram between the external boundary (refractive index of 1.7) and the inner circle with the radius of 1 may be regarded as propagating inside the plate, confined therein by total internal reflection. The x-y-projection vector in the diagram of FIG. 5 (from the diagram origin (0, 0) to the point ($k_x$, $k_y$) shows the direction of light propagation in the waveguide plate.

The region 502 shown by a solid line in FIG. 5 may represent the boundary inside which the image light projected into the waveguide plate is confined. Each pixel of the image corresponds to a certain direction of light represented by a point inside the region 502. When light is diffracted by the in-coupling grating (e.g., in-coupling grating 404), the light is translated in the k-vector presentation by the grating vector of the in-coupling grating. Region 504 in FIG. 5 represents the light after diffraction by the in-coupling grating. In some instances, as shown by the example of FIG. 5, part of the input image light may become directed outside the external boundary (e.g., the outer boundary with a radius of 1.7 in the diagram of FIG. 5). Light cannot propagate in the waveguide plate in such locations of the diagram, so this this part of image is not diffracted by the in-coupling grating. The diagram of FIG. 5 shows that the region 504 is cut by the external boundary (with a radius of 1.7).

As noted above, the in-coupled light propagates through the expansion grating (e.g., expansion grating 406) and is diffracted by the expansion grating toward the out-coupling grating (e.g., out-coupling grating 408). The light after diffraction by the expansion grating is represented in FIG. 5 by region 506. As shown in FIG. 5, region 506 is further cut by the external boundary (with a radius of 1.7). The area cut from the internal area of region 504 cannot be diffracted by the expansion grating, and thus it remains in the original direction and travels through the expansion grating undeflected. The dashed line inside of region 504 (labelled region 508 in FIG. 5) indicates the boundary between light diffracted by the expansion grating (e.g., corresponding to the display portion 416 of the input light 412 as shown and described with reference to FIG. 4) and not diffracted by the expansion grating (e.g., corresponding to the sampling portion 414 of the input light 412 as shown and described with reference to FIG. 4).

As noted above, the out-coupling grating diffracts the light outward from the waveguide plate, depicted in the diagram of FIG. 5 by a translation from region 506 back to region 502. As part of the image is not diffracted fully through the waveguide plate, the field-of-view transmitted may be limited. This is shown by the dashed line inside region 502, representing the boundary of the output image.

In accordance with the present disclosure, the part of the image content not diffracted by the expansion grating (e.g., represented by region 508 and corresponding to the sampling portion 414) may be used for sampling via sampling grating (e.g., the sampling grating may facilitate a translation in k-vector space from the region 508 back to the region 502). Such a configuration may facilitate a higher intensity of the sampled image. Also, intensity variation in the sampled image (which may result from manufacturing tolerances associated with the expansion grating) may be avoided.

In some instances, the sampled region (e.g., region 508 in FIG. 5) may correspond to the part of FOV outside the actual image of the display. In some instances, the sampled region may include image content, and such image content may be transmitted to the output grating through different in-coupling and expansion gratings on the waveguide plate (and/or a different waveguide plate within a waveguide stack).

The principles discussed hereinabove with reference to FIGS. 4 and 5 may be applied to waveguide stacks comprising multiple waveguide plates (e.g., similar to the examples shown in FIGS. 3A and 3B). For example, each waveguide plate of a waveguide stack may include a respective in-coupling grating, a respective expansion grating, and a respective out-coupling grating. A projection system may be configured to direct input light toward each of the respective in-coupling gratings of the waveguide stack.

For each waveguide plate, the respective in-coupling grating may be configured to cause at least a portion of the input light to propagate within the waveguide plate toward the respective expansion grating. The respective expansion grating may be configured to diffract at least the portion of the input light toward the respective out-coupling grating to generate an expanded-FOV representation of an image for viewing by an eye of a user.

At least one waveguide plate of the plurality of waveguide plates further comprises a sampling grating. For at least this waveguide plate, the respective in-coupling grating is configured to cause a sampling portion of the input light to propagate within the waveguide plate toward the sampling grating. The sampling grating of this waveguide is configured to diffract the sampling portion of the input light outward from the waveguide plate.

In some instances, each waveguide plate of the waveguide stack includes a respective sampling grating configured to receive a respective sampling portion of the input light diffracted by the respective in-coupling grating and diffract the respective sampling portion outward from the waveguide stack. In some instances, each of the waveguide plates of the waveguide stack is associated with a respective color channel. The input light may transmit through one or more of the waveguide plates of the waveguide stack to reach the respective in-coupling grating of one or more other waveguide plates of the waveguide stack.

Example Method(s) for Facilitating Alignment Control of Image Output

The following discussion now refers to a number of methods and method acts that may be performed by the disclosed systems. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

FIG. 6 illustrates an example flow diagram 600 depicting acts associated with facilitating alignment control of image output. The discussion of the various acts represented in the flow diagrams include references to various hardware components described in more detail with reference to FIG. 1.

Act 602 of flow diagram 600 includes detecting an alignment image via an image sensor, the alignment image at least partially capturing an alignment marker depicted by a sampling portion of input light, the sampling portion of the input light being diffracted toward the image sensor by a sampling grating of a waveguide plate, the sampling portion of the input light being diffracted toward the sampling grating by an in-coupling grating of the waveguide plate, the in-coupling grating of the waveguide plate being configured to receive the input light from a projection system and (i) diffract the sampling portion of the input light toward the sampling grating and (ii) diffract a display portion of the input light toward an expansion grating of the waveguide plate for expansion and diffraction by the expansion grating toward an out-coupling grating of the waveguide plate for further expansion and diffraction by the out-coupling grating to generate an expanded-FOV representation of at least a portion of an image depicted by the input light for viewing by an eye of a user. Act 602 is performed, in some instances, by a system utilizing processor(s) 102, storage 104, sensor(s) 106, input/output system(s) 108, communication system(s) 110, and/or other components.

Act 604 of flow diagram 600 includes detecting a second alignment image via a second image sensor, the second alignment image at least partially capturing a second alignment marker depicted by a second sampling portion of second input light, the second sampling portion of the second input light being diffracted toward the second image sensor by a second sampling grating of a second waveguide plate, the second sampling portion of the second input light being diffracted toward the second sampling grating by a second in-coupling grating of the second waveguide plate, the second in-coupling grating of the second waveguide plate being configured to receive the second input light from a second projection system and (i) diffract the second sampling portion of the second input light toward the second sampling grating and (ii) diffract a second display portion of the second input light toward a second expansion grating of the second waveguide plate for expansion and diffraction by the second expansion grating toward a second out-coupling grating of the second waveguide plate for further expansion and diffraction by the second out-coupling grating to generate a second expanded-FOV representation of at least a portion of a second image depicted by the second input light for viewing by a second eye of the user. Act 604 is performed, in some instances, by a system utilizing processor(s) 102, storage 104, sensor(s) 106, input/output system(s) 108, communication system(s) 110, and/or other components.

Act 606 of flow diagram 600 includes modifying the image or the second image based upon the alignment image or the second alignment image. Act 606 is performed, in some instances, by a system utilizing processor(s) 102, storage 104, sensor(s) 106, input/output system(s) 108, communication system(s) 110, and/or other components.

Additional Details Related to Computer Systems

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for facilitating alignment control of image output, the method comprising:

detecting an alignment image via an image sensor, the alignment image at least partially capturing an alignment marker depicted by a sampling portion of input light, the sampling portion of the input light being diffracted toward the image sensor by a sampling grating of a waveguide plate, the sampling portion of the input light being diffracted toward the sampling grating by an in-coupling grating of the waveguide plate, the in-coupling grating of the waveguide plate being configured to receive the input light from a projection system and (i) diffract a display portion of the input light toward an expansion grating of the waveguide plate for expansion and diffraction by the expansion grating toward an out-coupling grating of the waveguide plate for further expansion and diffraction by the out-coupling grating to generate an expanded-FOV representation of at least a portion of an image depicted by the input light for viewing by an eye of a user and (ii) diffract the sampling portion of the input light toward the sampling grating in a manner that causes the sampling portion of the input light to avoid diffraction by the expansion grating;

detecting a second alignment image via a second image sensor, the second alignment image at least partially capturing a second alignment marker depicted by a second sampling portion of second input light, the second sampling portion of the second input light being diffracted toward the second image sensor by a second sampling grating of a second waveguide plate, the second sampling portion of the second input light being diffracted toward the second sampling grating by a second in-coupling grating of the second waveguide plate, the second in-coupling grating of the second waveguide plate being configured to receive the second input light from a second projection system and (i) diffract a second display portion of the second input light toward a second expansion grating of the second waveguide plate for expansion and diffraction by the second expansion grating toward a second out-coupling grating of the second waveguide plate for further expansion and diffraction by the second out-coupling grating to generate a second expanded-FOV representation of at least a portion of a second image depicted by the second input light for viewing by a second eye of the user and (ii) diffract the second sampling portion of the second input light toward the second sampling grating in a manner that causes the second sampling portion of the second input light to avoid diffraction by the second expansion grating; and modifying the image or the second image based upon the alignment image or the second alignment image or based upon a comparison of the alignment image and the second alignment image.

2. The method of claim 1, wherein the in-coupling grating, the expansion grating, or the sampling grating comprises a surface relief grating (SRG).

3. The method of claim 1, wherein a region of the in-coupling grating that diffracts the display portion of the input light toward the expansion grating comprises a same grating period and grating orientation as a region of the in-coupling grating that diffracts the sampling portion of the input light toward the sampling grating.

4. The method of claim 1, wherein the sampling grating and the expansion grating are disposed on a same parallel surface of the waveguide plate.

5. The method of claim 1, wherein the sampling grating comprises a same grating period or grating orientation as the in-coupling grating.

6. The method of claim 1, wherein the waveguide plate further comprises an out-coupling grating configured to diffracts the display portion of the input light expanded by the expansion grating outward from the waveguide plate.

7. The method of claim 6, wherein the out-coupling grating is configured to further expand the display portion of the input light expanded by the expansion grating in at least a second dimension.

8. The method of claim 6, wherein the sampling grating is distinct from the out-coupling grating.

9. The method of claim 6, wherein the sampling grating comprising includes a different grating period or grating orientation than the out-coupling grating.

10. The method of claim 1, wherein the sampling grating includes a surface relief grating.

11. The method of claim 1, wherein the in-coupling grating includes a surface relief grating.

12. The method of claim 1, wherein the expansion grating includes a surface relief grating.

13. A computer system that facilitates alignment control of image output, the computer system comprising:

one or more processors; and one or more hardware storage devices that store instructions that are executable by the one or more processors to cause the computer system to:

detect an alignment image via an image sensor, the alignment image at least partially capturing an alignment marker depicted by a sampling portion of input light, the sampling portion of the input light being diffracted toward the image sensor by a sampling grating of a waveguide plate, the sampling portion of the input light being diffracted toward the sampling grating by an in-coupling grating of the waveguide plate, the in-coupling grating of the waveguide plate being configured to receive the input light from a projection system and (i) diffract a display portion of the input light toward an expansion grating of the waveguide plate for expansion and diffraction by the expansion grating toward an out-coupling grating of the waveguide plate for further expansion and diffraction by the out-coupling grating to generate an expanded-FOV representation of at least a portion of an image depicted by the input light for viewing by an eye of a user and (ii) diffract the sampling portion of the input light toward the sampling grating in a manner that causes the sampling portion of the input light to avoid diffraction by the expansion grating;

detect a second alignment image via a second image sensor, the second alignment image at least partially capturing a second alignment marker depicted by a second sampling portion of second input light, the second sampling portion of the second input light being diffracted toward the second image sensor by a second sampling grating of a second waveguide plate, the second sampling portion of the second input light being diffracted toward the second sampling grating by a second in-coupling grating of the second waveguide plate, the second in-coupling grating of the second waveguide plate being configured to receive the second input light from a second projection system and (i) diffract a second display portion of the second input light toward a second expansion grating of the second waveguide plate for expansion and diffraction by the second expansion grating toward a second out-coupling grating of the second waveguide plate for further expansion and diffraction by the second out-coupling grating to generate a second expanded-FOV representation of at least a portion of a second image depicted by the second input light for viewing by a second eye of the user and (ii) diffract the second sampling portion of the second input light toward the second sampling grating in a manner that causes the second sampling portion of the second input light to avoid diffraction by the second expansion grating; and modify the image or the second image based upon the alignment image or the second alignment image or based upon a comparison of the alignment image and the second alignment image.

14. The computer system of claim 13, wherein a region of the in-coupling grating that diffracts the display portion of the input light toward the expansion grating comprises a same grating period and grating orientation as a region of the in-coupling grating that diffracts the sampling portion of the input light toward the sampling grating.

15. The computer system of claim 13, wherein the in-coupling grating, the expansion grating, or the sampling grating comprises a surface relief grating (SRG).

16. The computer system of claim 13, wherein a region of the in-coupling grating that diffracts the display portion of the input light toward the expansion grating comprises a same grating period and grating orientation as a region of the in-coupling grating that diffracts the sampling portion of the input light toward the sampling grating.

17. The computer system of claim 13, wherein the sampling grating and the expansion grating are disposed on a same parallel surface of the waveguide plate.

18. The computer system of claim 13, wherein the sampling grating comprises a same grating period or grating orientation as the in-coupling grating.

19. The computer system of claim 13, wherein the out-coupling grating diffracts the display portion of the input light expanded by the expansion grating outward from the waveguide plate.

20. The computer system of claim 19, wherein the out-coupling grating is configured to further expand the display portion of the input light expanded by the expansion grating in at least a second dimension.

* * * * *